US011412313B2

(12) United States Patent
Folgner et al.

(10) Patent No.: US 11,412,313 B2
(45) Date of Patent: Aug. 9, 2022

(54) SHARING TIMESTAMPS FOR VIDEO CONTENT IN A MESSAGING PLATFORM

(71) Applicant: Twitter, Inc., San Francisco, CA (US)

(72) Inventors: Michael Folgner, San Francisco, CA (US); Asli Kimya, San Francisco, CA (US); Christian Niles, San Francisco, CA (US); Chen-Rui Chou, San Francisco, CA (US); Lucas Yan, San Francisco, CA (US); Noah Jorgensen, San Francisco, CA (US); Jonah Grant, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 77 days.

(21) Appl. No.: 16/401,096

(22) Filed: May 1, 2019

(65) Prior Publication Data

US 2019/0342634 A1    Nov. 7, 2019

Related U.S. Application Data

(60) Provisional application No. 62/665,927, filed on May 2, 2018.

(51) Int. Cl.
*H04N 21/8547* (2011.01)
*H04N 21/858* (2011.01)
(Continued)

(52) U.S. Cl.
CPC ......... *H04N 21/8547* (2013.01); *H04L 51/10* (2013.01); *H04N 21/2187* (2013.01); *H04N 21/858* (2013.01)

(58) Field of Classification Search
CPC ... H04L 51/10; H04L 51/32; H04N 21/47217; H04N 21/4788; H04N 21/8547; H04N 21/858; H04N 21/2187
See application file for complete search history.

(56) References Cited

U.S. PATENT DOCUMENTS 9,253,533 B1 * 2/2016 Morgan ............. H04N 21/4325
9,665,237 B1 * 5/2017 Hintermeister .... H04N 21/4334
(Continued)

OTHER PUBLICATIONS

Folgner, "Introducing Timestamps: A new way to share live videos", Product Blog, Mar. 29, 2018, 2 pages.
(Continued)

*Primary Examiner* — Chenea Davis
(74) *Attorney, Agent, or Firm* — Brake Hughes Bellermann LLP

(57) ABSTRACT

According to an aspect, a method includes receiving, by a client application, a video stream of a live broadcast from a messaging platform, displaying, by the client application, the video stream of the live broadcast on a user interface of the client application, receiving, via a timestamp selector on the user interface, a selection of a time location in a time window of a timeline of the video stream of the live broadcast, generating, by the client application, a timestamp based on the time location received via the timestamp selector, and sending, by the client application, a message that includes the timestamp to the messaging platform to share the video stream of the live broadcast on the messaging platform such that playback of the shared video stream of the live broadcast is configured to start at the time location indicated by the timestamp.

15 Claims, 12 Drawing Sheets

(51) Int. Cl.
*H04L 51/10* (2022.01)
*H04N 21/2187* (2011.01)

(56) References Cited

U.S. PATENT DOCUMENTS

| | | | |
|---|---|---|---|
| 9,754,624 B2 | 9/2017 | Dyer-Smith | |
| 9,953,034 B1* | 4/2018 | Parlikar | G06F 16/40 |
| 2014/0089424 A1* | 3/2014 | Oztaskent | H04L 51/08 |
| | | | 709/206 |
| 2014/0214920 A1* | 7/2014 | Wong | H04L 51/04 |
| | | | 709/203 |
| 2014/0325393 A1* | 10/2014 | Quinn | H04N 21/47202 |
| | | | 715/753 |
| 2016/0149956 A1* | 5/2016 | Birnbaum | H04L 63/101 |
| | | | 726/1 |
| 2017/0064404 A1* | 3/2017 | Zane | H04L 67/02 |
| 2017/0164028 A1* | 6/2017 | Skolicki | H04N 21/252 |
| 2019/0069047 A1* | 2/2019 | Wood | H04N 21/47217 |

OTHER PUBLICATIONS

Pot, "Howto Share YouTube Videos Starting at a Certain Point", How-to Geek, Dec. 30, 2016, 5 pages.

\* cited by examiner

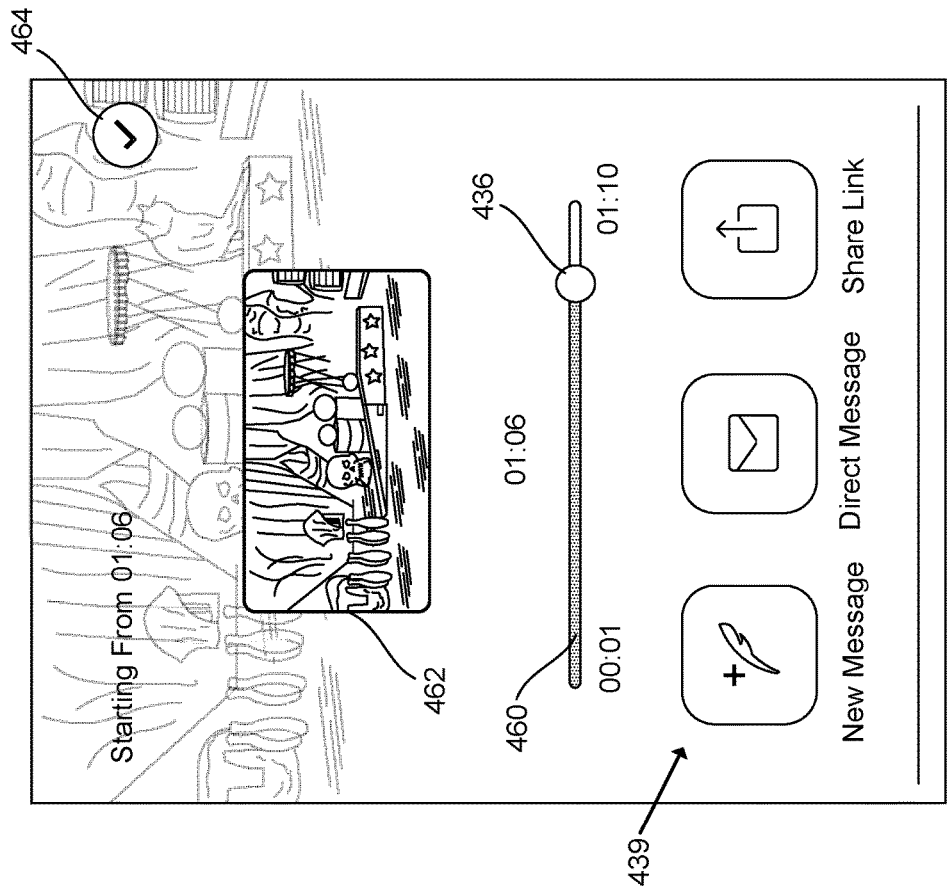
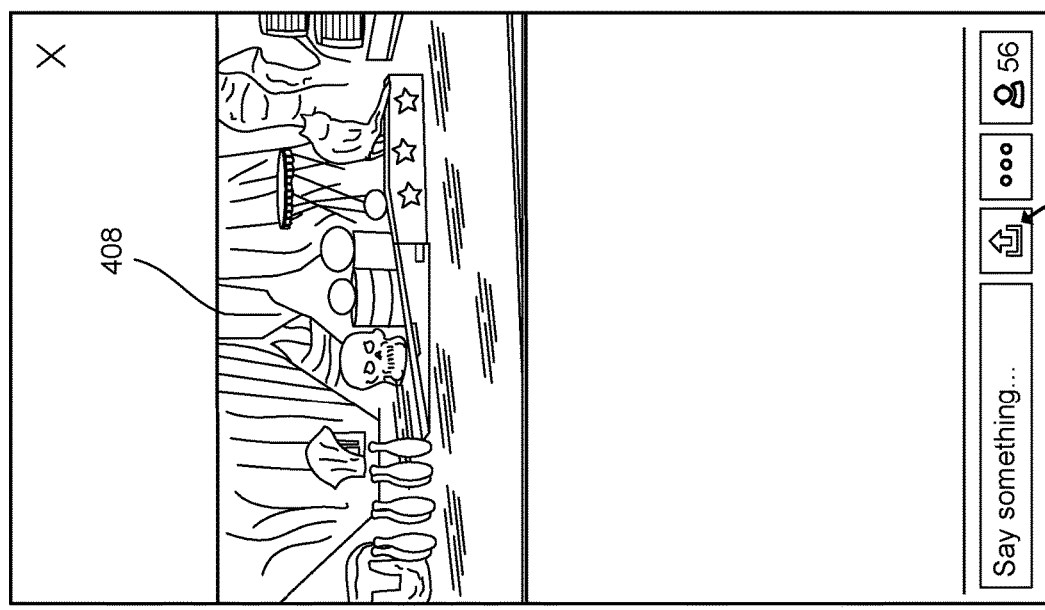
FIG. 4B
FIG. 4A

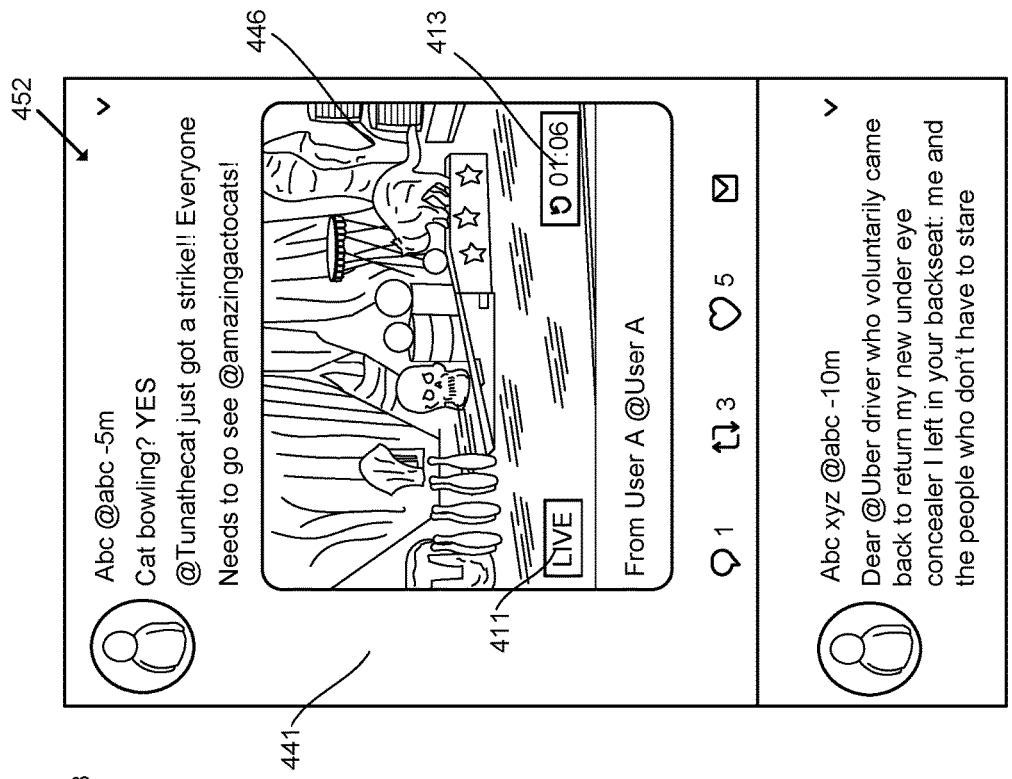
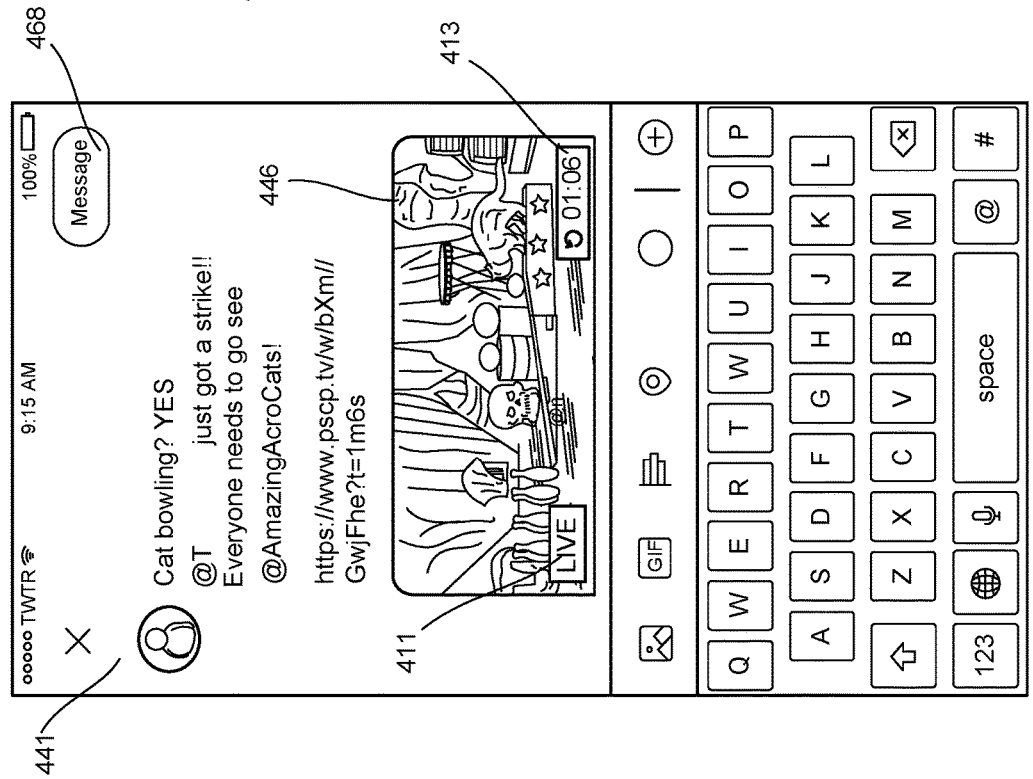
FIG. 4D
FIG. 4C

630

632 — Displaying, by a client application executable by a computing device, a message in a timeline of a user of the client application, the message identifying a video stream of a live broadcast, the message including a timestamp indicating a time location in the video stream 634 — Receiving, by the client application, a selection of the video stream 636 — Displaying, by the client application, the video stream received from a replay video stack of a messaging platform such that playback of the video stream starts at the time location indicated by the timestamp 638 — Receiving, by the client application, a live selection of the video stream 640 — Displaying, by the client application, the video stream received from a real-time video stack of a messaging platform in response to the live selection

FIG. 6C

SHARING TIMESTAMPS FOR VIDEO CONTENT IN A MESSAGING PLATFORM

RELATED APPLICATION

This application is a non-provisional of, and claims priority to, U.S. Provisional Application No. 62/665,927, filed on May 2, 2018, entitled "Timestamps Sharing of Video Content," the disclosure of which is incorporated herein in its entirety.

BACKGROUND

In some social media platforms, users can share live broadcast streams or replays of live broadcast streams. In some examples, when sharing a live broadcast stream, a link to the live broadcast stream is identified in a message such that when selected causes the viewer to start watching from the live broadcast from the beginning or at the live moment. In some examples, the length of the video content, and the point in time at which meaningful moments occur in the video content, may make it difficult for viewers to access the meaningful moments included the video content, intended for sharing and discussion by the user sharing the video content.

SUMMARY

The embodiments are related to a timestamp generator, executable by a client application, configured to generate a timestamp from a video stream of a live broadcast based on information received from a user via a user interface. For example, the user may be viewing the live video stream on a display of a computing device, and notice an interesting moment in the live broadcast. In some examples, in response to receipt of a selection to share the video stream, the client application may render a timestamp selector that allows the user to slide back to the time the user would like his/her audience to start watching. In some examples, the timestamp selector includes a movable user interface (UI) element that moves with respect to a time window of a timeline of the video stream in order to select a time location in the video stream that corresponds to the interesting moment (e.g., the user may scrub the last two or three minutes of the video stream).

The timestamp generator may generate a timestamp that indicates the time location in the video stream selected by the user using the timestamp selector. The client application may allow the user to add any comments or description about the video stream to be shared, and generate a message to share the video stream at the time location indicated by the timestamp, and transmit the message to a messaging platform executable by a server computer. In some examples, the message may include the timestamp, the video stream identifier, and the sender identifier.

In some examples, the messaging platform identifies the users intended to receive the message (e.g., based on a connection graph), and then transmits the message to the identified users. In some examples, the shared message with the timestamp may be rendered in a timeline of each user account linked to the sender's identifier in the connection graph. Then, a user viewing their timeline may notice the shared message and select the video stream with the timestamp such that playback of the video stream of the live broadcast is initiated from the time location indicated by the timestamp. In some examples, the shared message that identifies the video stream includes a live tag indicating that the video stream is still occurring (e.g., a red box with the term "Live"), and a timestamp tag indicating that replay starts from a time location before the current point (e.g., the time location selected by the sharer). Upon selection of the video stream, the video stream may be played back starting from the time location indicated by the timestamp. However, in response to the selection of the live tag, the client application may skip to the live point in the video stream.

Some conventional video sharing platform may experience latency issues when attempting to transition between different time points of a live broadcast. For example, the video stream may be live (e.g., streaming from the latest point in time), or the video stream may be a replay of a still-continuing live broadcast (e.g., replaying from 20 minutes behind the current point in time). However, in some conventional video sharing platforms, there may be a relatively high level of latency from transitioning from a video streaming at its current live time point to replaying from a previous time point (e.g., rewinding a live broadcast five minutes) or transitioning from a previous time point of the video stream to the current live point of the live broadcast (e.g., skipping to the live point). In addition, it is noted that video sharing platforms that provide replays of ended broadcasts (e.g., recorded broadcasts) may not necessarily encounter these latency issues. In addition, in some conventional video sharing platform, livestreams of video content could only be viewed synchronously, with no scrubbing affordance, and no way of going back in time.

However, according to the embodiments, the messaging platform includes a real-time video stack (e.g., live playlist) that provides live video streams (e.g., video streams streaming from their live points), and a replay video stack (e.g., replay playlist) that provides replays of live broadcasts, and the messaging platform is configured to switch between the real-time video stack and the replay video stack when providing video streams of live broadcasts and providing video stream of live broadcasts with timestamps in order to reduce the amount of latency associated with transitioning between different time points of a live broadcast.

For example, a user may be viewing a live video stream on the client application, which, in this case, the messaging platform may serve the live video stream from the real-time video stack. Then, the user may wish to point out a certain moment in the live video stream when sharing the video stream on the messaging platform. The client application may render a scrubbable video feed that is served from the replay video stack, and use the timestamp selector to select a time location in the live broadcast. The timestamp generator may generate the timestamp based on the time location selected by the timestamp selector, and send the timestamp to the messaging platform via an application programming interface (API). In some examples, the messaging platform generates a timestamp thumbnail that is a thumbnail of the image at the frame of the time location indicated by the timestamp, and stores the timestamp, the timestamp thumbnail, the stream identifier, and the sharer identifier in the message database. Then, the messaging platform may determine the relevant user accounts (e.g., fan-out) to serve the message, and deliver the message in the timeline of each of the user accounts.

Then, a user viewing their timeline may notice the shared message and select the video stream with the timestamp such that playback of the video stream of the live broadcast is initiated from the time location indicated by the timestamp. The video stream may still be part of the live broadcast (e.g. the broadcast has not ended). However, when replaying from the timestamp, the messaging platform may serve the video stream of the live broadcast from the replay video stack at the time location indicated by the timestamp. Then, when the user switches to the live time point, the messaging platform may serve the video stream of the live broadcast from the real-time video stack. In this manner, the latency associated with switching to different time points of a live broadcast may be reduced.

According to an aspect, a method for sharing a timestamp of a real-time video stream in a messaging platform includes receiving, by a client application executable by a computing device, a video stream of a live broadcast from a messaging platform executable by a server computer, displaying, by the client application, the video stream of the live broadcast on a user interface of the client application, receiving, via a timestamp selector on the user interface, a selection of a time location in a time window of a timeline of the video stream of the live broadcast, generating, by the client application, a timestamp based on the time location received via the timestamp selector, and sending, by the client application, a message that includes the timestamp to the messaging platform to share the video stream of the live broadcast on the messaging platform such that playback of the shared video stream of the live broadcast is configured to start at the time location indicated by the timestamp.

According to an aspect, a system for sharing a timestamp of a real-time video stream in a messaging platform includes a messaging platform executable by a server computer, the messaging platform configured to transmit, over a network, a video stream of a live broadcast to a client application executing on a first computing device, receive, over the network, a message to share the video stream of the live broadcast on the messaging platform, where the message includes a timestamp indicating a time location in the video stream, transmit, over the network, the message to a client application executing on a second computing device, and transmit, over the network, the video stream of the live broadcast starting at the time location indicated by the timestamp to the client application executing on the second computing device.

According to an aspect, a non-transitory computer-readable medium storing executable instructions that when executed by at least one processor are configured to cause the at least one process to share a timestamp of a real-time video stream in a messaging platform, where the executable instructions includes instructions to display, by a client application executable by a computing device, a message in a timeline of a user of the client application, where the message identifies a video stream of a live broadcast, the message including a timestamp indicating a time location in the video stream, receive, by the client application, a selection of the video stream, display, by the client application, the video stream received from a replay video stack of a messaging platform such that playback of the video stream starts at the time location indicated by the timestamp, receive, by the client application, a live selection of the video stream, and display, by the client application, the video stream received from a real-time video stack of the messaging platform in response to the live selection.

BRIEF DESCRIPTION OF THE DRAWINGS

FIGS. 4A through 4D illustrates various user interface screens for sharing timecoded video streams of a live broadcast according to an aspect.

FIG. 6C illustrates a flow chart depicting example operations of the client application for viewing timecoded video streams of a live broadcast according to an aspect.

DETAILED DESCRIPTION

Figure 1:
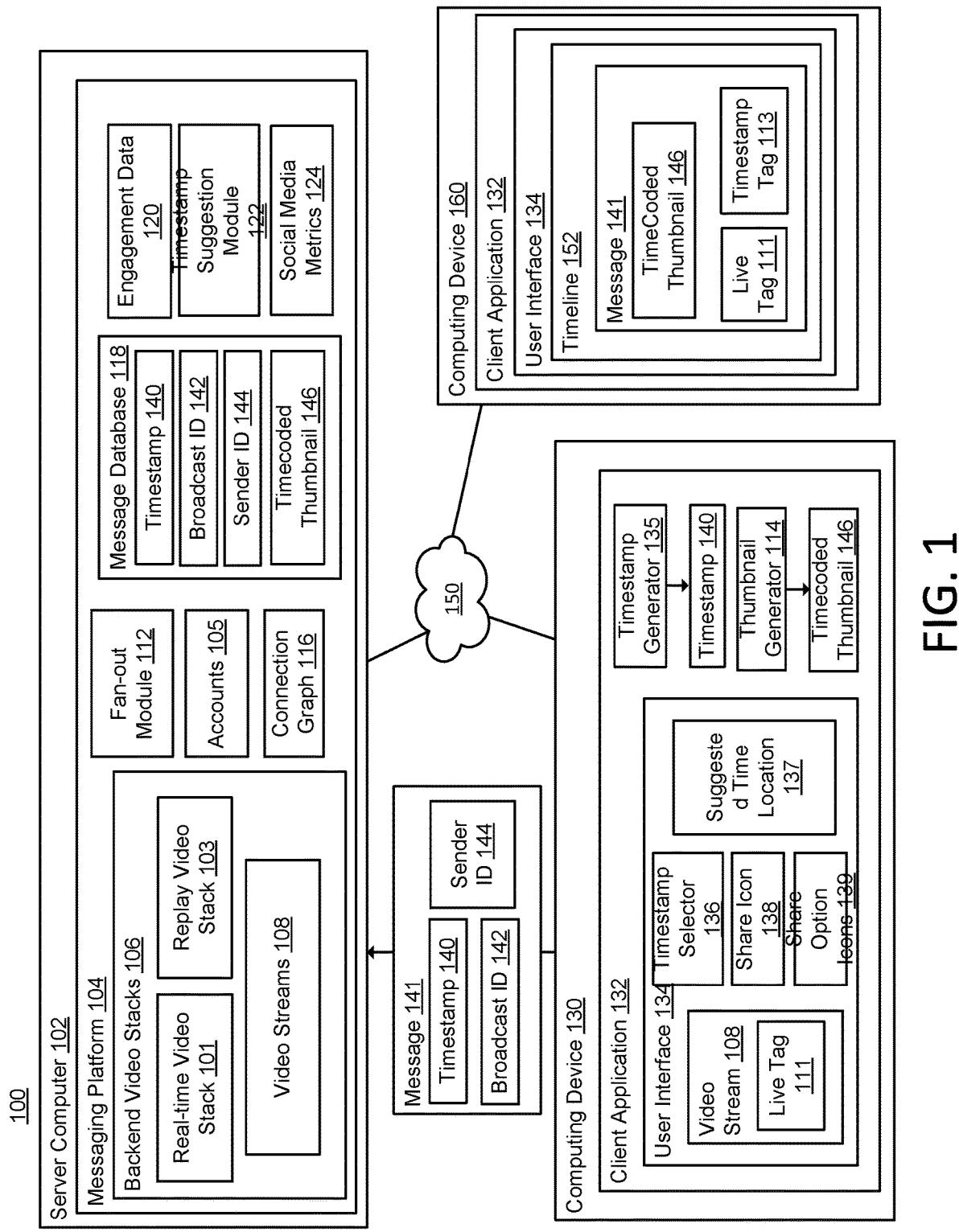
FIG. 1 is a schematic diagram of a system for sharing timestamps in video streams of a live broadcast according to an aspect.

FIG. 1 is a schematic diagram of a system 100 having a messaging platform 104 executable by a server computer 102, and a client application 132 executable by a computing device 130 (and a computing device 160). Although two computing devices are shown in FIG. 1, it is understood that the messaging platform 104 may be configured to communicate with any number of computing devices. In some examples, the client application 132 executing on the computing device 130 is associated with an account 105 registered with the messaging platform 104, and the client application 132 executing on the computing device 160 is associated with a different account 105 registered with the messaging platform 104. Also, the client application 132 executing on the computing device 130 is configured to generate a message 141 to be shared on the messaging platform 104, and the client application 132 executing on the computing device 160 is configured to receive and render the message 141 on the user's timeline 152 of the client application 132. For example, the account 105 associated with the computing device 160 may be linked to the account 105 associated with the computing device 130 in a connection graph 116 stored at the messaging platform 104.

The client application 132 is configured to communicate with the messaging platform 104 over a network 150. The client application 132 may be a native application executing on an operating system of the computing device 130 (or the computing device 160) or may be a web-based application executing on the server computer 102 (or another server) in conjunction with a browser-based application of the computing device 130 (or the computing device 160). The computing device 130 (or the computing device 160) may access the messaging platform 104 via the network 150 through the use of any type of network connections and/or application programming interfaces (APIs) in a manner that permits the client application 132 and the messaging platform 104 to communicate with each other.

The messaging platform 104 and the client application 132 are configured to facilitate real-time communication between users. The messaging platform 104 may store millions of accounts 105 of individuals, businesses, and/or entities (e.g., pseudonym accounts, novelty accounts, etc.).

One or more users of each account 105 may use the client application 132 to send messages to other accounts 105 inside and/or outside of the messaging platform 104. The messages may include video, images, and/or text. The messaging platform 104 may be configured to enable users to communicate in real-time, i.e., to converse (e.g., send and/or share messages) with other users with minimal delay (e.g., delay that may not be perceptible) and/or to conduct a conversation with one or more other users during simultaneous sessions. In other words, the messaging platform 104 may allow a user to broadcast messages and may display the messages to one or more other users within a reasonable time frame so as to facilitate a live conversation between users.

Recipients of a message may have a predefined graph relationship with an account 105 of the user broadcasting the message in the connection graph 116 on the server computer 102. In some examples, a portion of the connection graph 116 is included in the client application 132. The connection graph 116 is a data structure representing relationships (i.e., connections) between one or more accounts 105. For example, the connection graph 116 may be a data set that stores relationships between the accounts 105. Relationships may include friending, following, linking, or some other relationship. An account 105 is directly connected to another account 105 in the connection graph 116 when the two entities are connected by a path length of one, i.e., there are no intervening nodes.

The computing device 130 may be a mobile computing device (e.g., a smart phone, a PDA, a tablet, a laptop computer, a wearable device, such as a wrist or head mounted device, a virtual reality device, a drone equipped camera etc.) or a non-mobile computing device (e.g., a desktop computing device). The computing device 130 also includes various network interface circuitry, such as for example, a mobile network interface through which the computing device 130 can communicate with a cellular network, a Wi-Fi network interface with which the computing device 130 can communicate with a Wi-Fi base station, a Bluetooth network interface with which the computing device 130 can communicate with other Bluetooth devices, and/or an Ethernet connection or other wired connection that enables the computing device 130 to access the network 150. The computing device 160 may be similar or the same as the computing device 130.

The server computer 102 may be a single computing device, or may be a representation of two or more distributed computing devices communicatively connected to share workload and resources. The server computer 102 may include at least one processor and a non-transitory computer-readable medium that stores executable instructions that when executed by the at least one processor cause the at least one processor to perform the operations discussed herein.

The messaging platform 104 includes backend video stacks 106 configured to provide video streams 108 of live broadcasts. In some examples, the backend video stacks 106 include multiple (different) video stacks that serve video content to users of the messaging platform 104. The backend video stacks 106 may include a real-time video stack 101 (e.g., a live playlist) that provides live video streams (e.g., video streams streaming from their live points) to the users of the messaging platform 104. A video stream 108 is live or real-time when the source of the video stream 108 is a video capture device rather than storage media. In some examples, the real-time video stack 101 provides video streams 108 from the video capture devices (as opposed to storage media).

The backend video stacks 106 may include a replay video stack 103 (e.g., replay playlist) that provides replays of video streams 108 of the live broadcasts to the users of the messaging platform 104. In some examples, the video streams 108 provided by the replay video stack 103 are replays of a still-continuing live broadcast. In some examples, the video streams 108 provided by the replay video stack 103 are replays of an ended live broadcast. In some examples, the replay video stack 103 provides video streams 108 from storage media (as opposed to video capture devices) to the users of the messaging platform 104. In some examples, the messaging platform 104 is configured to switch between the real-time video stack 101 and the replay video stack 103 when providing the video streams 108 of live broadcasts and providing video stream 108 of live broadcasts with timestamps 140 in order to reduce the amount of latency associated with transitioning between different time points of a live broadcast.

With respect the computing device 130, a user may use the client application 132 to view a video stream 108 of a live broadcast on a user interface 134 of the client application 132. In some examples, the real-time video stack 101 may provide the video stream 108, over the network 150, for display on the user interface 134. As such, the user may be watching the video stream 108 from its current time point. For example, the messaging platform 104 may identify the video stream 108 in one or more locations (e.g., timeline, search result, etc.) on the user interface 134 of the client application 132, and in response to a selection of the video stream 108, the user can view the video stream 108 on the computing device 130. The video stream 108 may include a live tag 111 indicating that the broadcast is live or real-time. For example, the live tag 111 may include a visual indicator indicating that the broadcast is live or real-time. In some examples, the live tag 111 includes a description "Live."

During the course of viewing the video stream 108 of the live broadcast, the user may notice an interesting moment that they would like to share with other users on the messaging platform 104. For example, in response to the selection of a share icon 138, the client application 132 may provide a timestamp selector 136 in order to select a time location in the video stream 108. In some examples, the client application 132 provides share option icons 139 that provides options for the user on how to share the video stream 108 in the messaging platform 104 (e.g., send to linked users, direct message, share link, etc.). The time location may be the time point in the video stream 108 that the user wants other viewers to start watching the video stream 108. For example, the timestamp selector 136 may be a UI interface element that allows the user to go back to the time the user would like their audience to start watching. In some examples, the timestamp selector 136 includes a movable UI element that moves with respect to a time window of a timeline of the video stream in order to select a time location in the video stream 108 that corresponds to the interesting moment. However, the timestamp selector 136 may be any type of user interface element that permits the user to select a time location in the video stream 108.

Figure 2:
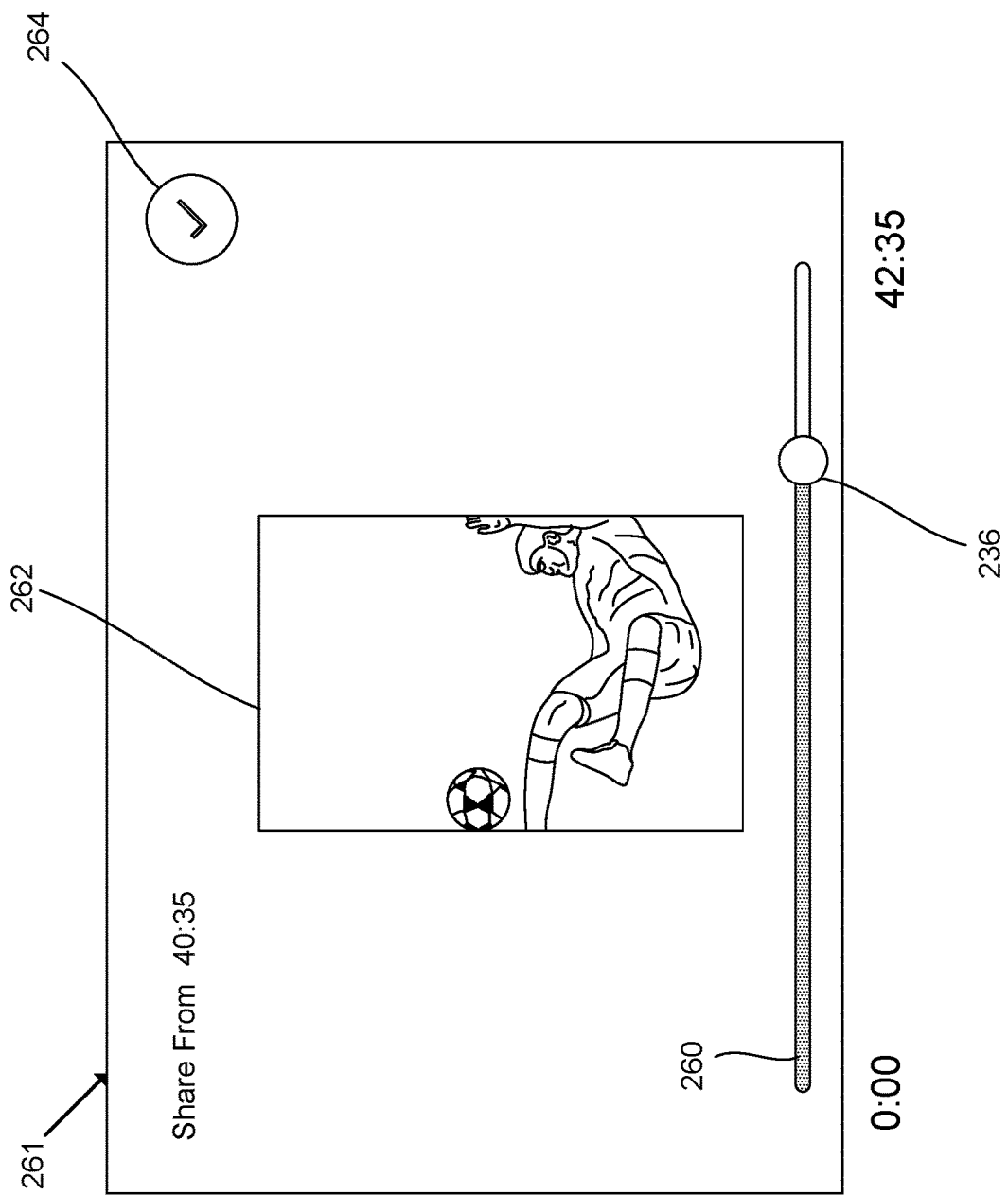
FIG. 2 illustrates an example of a timestamp selector interface of a client application according to an aspect.

FIG. 2 illustrates a UI screen 261 that depicts an example of a movable UI element 236 as the timestamp selector 136 according to an aspect. As shown in FIG. 2, the movable UI element 236 is configured to move along a time window 260 of the video stream 108 such that a position of the movable UI element 236 with respect to the time window 260 indicates the time location. In the example of FIG. 2, the time window 260 corresponds to the full timeline of the video stream 108. In addition, the UI screen 261 includes a video display 262 that displays a portion of the video stream 108 that corresponds to the position of the movable UI element 236. As such, the user is able to scrub the video stream 108 in order to locate the time location in which the user would like other viewers to start watching the video stream 108. In some examples, the messaging platform 104 is configured to switch to the replay video stack 103 to display the frames of the video stream 108 in the video display 262. In response to a selection on a UI element 264, the client application 132 is configured to receive the selected time location (e.g., 40:35 in FIG. 2).

Figure 3:
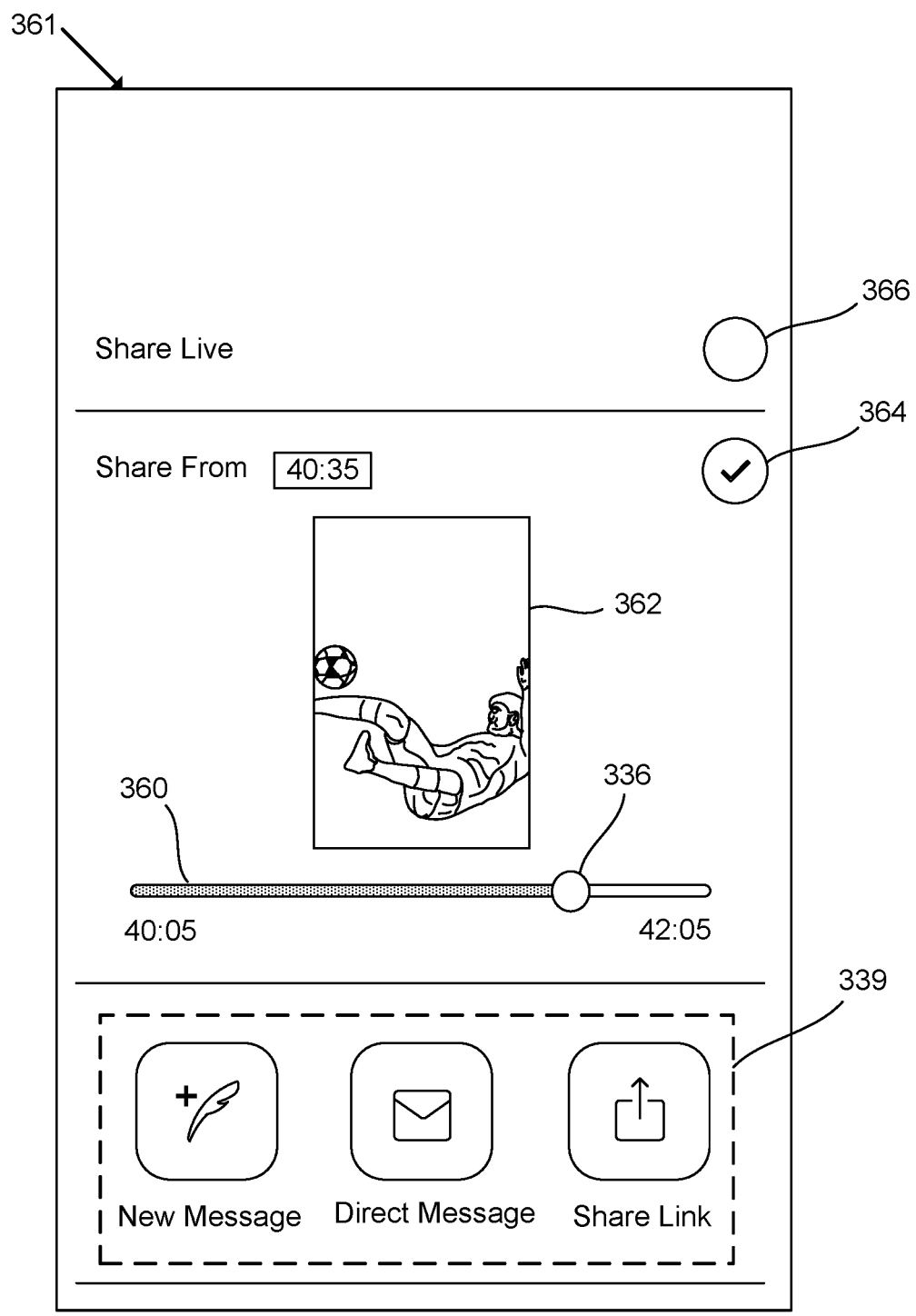
FIG. 3 illustrates an example of a timestamp selector interface of a client application according to another aspect.

FIG. 3 illustrates a UI screen 361 that depicts an example of a movable UI element 336 as the timestamp selector 136 according to another aspect. As shown in FIG. 3, the movable UI element 336 is configured to move along a time window 360 of the video stream 108 such that a position of the movable UI element 336 with respect to the time window 360 indicates the time location. In the example of FIG. 3, the time window 360 is less than the full timeline of the video stream 108. In some examples, the time window 360 is 2 minutes. In some examples, the time window 360 is in a range of 10 minutes to 1 minute. In some examples, the time window 360 is in a range of 5 minutes to 1 minute. In addition, the UI screen 361 includes a video display 362 that displays a portion of the video stream 108 that corresponds to the position of the movable UI element 336. As such, the user is able to scrub the video stream 108 (e.g., scrub the last 2 minutes from the live time point) in order to locate the time location in which the user would like other viewers to start watching the video stream 108. In some examples, as indicated above, the messaging platform 104 is configured to switch to the replay video stack 103 to display the frames of the video stream 108 in the video display 262.

In response to a selection on a UI element 364, the client application 132 is configured to receive the selected time location (e.g., 40:35 in FIG. 32). In some examples, the UI screen 361 provides a selection to share the video stream 108 at the live time point. For example, in response to a selection on a UI element 366, the client application 132 is configured to receive the current live time point. In addition, the UI screen 361 may provide share option icons 339 in order provide options on how the user would like to share the video stream at the selected time location (e.g., new message, direct message, share link).

In some examples, when using the movable UI element 336 for timestamping video content, the user may continue to watch the video content while scrubbing (e.g., the video display 362). In the arrangement shown in FIG. 3, sharing may take two steps, including tap to share and choose a share option using, for example, one of a number of easily accessible share buttons, or share options, or share links. While the user chooses the moment to share, audio of the ongoing stream may keep the user grounded to the context. Additionally, sharing a live broadcast can be viewed as a way to encourage others to come join the user in watching, so this treats watching live with friends as an equal counterpart to witnessing the moment shared by the original user/viewer. The shortened scrubbing window corresponding to the movable UI element 336 may allow users to more easily navigate to the right moment to share. A radio button may also be available to allow a user to choose to share live instead of sharing with a timestamp using the share buttons.

Referring back to FIG. 1, in some examples, the client application 132 receives one or more suggested time locations 137, and then provides the suggested time locations 137 in the user interface 134 of the client application 132. In some examples, a suggested time location 137 is a time point programmatically determined at the messaging platform 104 using engagement data 120 associated with the video stream 108 and/or social media metrics 124 associated with the video stream 108.

For example, the social media metrics 124 may indicate a volume of social media engagements with the video stream 108 as messages, posts, comments, signals of appreciation (e.g., likes) about the video stream 108. The social media metrics 124 or volume of social media engagements may be the number of social media engagements per a certain unit of time. In some examples, the volume of social media engagements may be the number of messages per minute that relate to the video stream 108 (e.g., includes one or more keywords that have been identified as being indicative of the video stream 108).

The messaging platform 104 may include a timestamp suggestion module 122 configured to identify a time location (or multiple time locations) as a suggested time location 137(s) in the video stream 108 based on the social media metrics 124 in order to direct the user to potentially interesting or relevant points in the video stream 108. The timestamp suggestion module 122 may correlate the volume of social media engagements with a timeline of the video stream 108. For example, the timestamp suggestion module 122 may identify related social media engagements from the messaging platform 104 using certain keywords, identifiers, tags, hashtags, or other mechanisms that can identify information exchanged on the messaging platform 104 (generally referred to as keywords). For instance, the use of keywords permits the timestamp suggestion module 122 to obtain a sense of the level of engagement with the video stream 108 (e.g., are there many people interested in this broadcast? Which parts are the most interesting to the viewers?). There may be a spike in the social media engagements for a particular time (or time interval). This spike may be caused by an important event occurring in the video stream 108, and the timestamp suggestion module 122 may be able to determine which part of the video stream 108 corresponds to the spike based on the mapping or correlation of the volume of social media engagements with the timeline of the video stream 108.

In some examples, the timestamp suggestion module 122 configured to identify a time location (or multiple time locations) as a suggested time location 137(s) in the video stream 108 based on the engagement data 120 associated with the video stream 108 in order to direct the user to potentially interesting or relevant points in the video stream 108. In some examples, the engagement data 120 includes signals of approvals (e.g., taps on the screen) on various portions of the video stream 108, comments on the video stream 108, and/or the number of shares of the video stream 108. For example, each of these engagements may be associated with a particular time in the video stream 108, and when the number of engagement is above a threshold level for a particular portion of the video stream 108, the timestamp suggestion module 122 may identify a suggested time location 137 having the portion of the video stream 108 having a high number of engagements.

In some examples, the video stream 108 (e.g., when served from the real-time video stack 101) includes a closed feedback loop in which engagements from viewers are provided to the broadcaster and to other viewers in real time. For example, a viewer may comment on the broadcast, may signal approval for specific moments in the broadcast (e.g., tap on the screen), and may invite other social media users to join the broadcast. Such engagements are provided back to viewers and the broadcaster within a latency period (e.g., two seconds or less) suitable to allow the broadcaster to react to and interact with the viewers. The broadcaster, for example, may decide to continue the broadcast when the broadcast is popular as suggested by the number of viewers, by a high level of engagements, viewer comments, and other feedback, and/or by the identity of one or more viewers. This information may be stored as the engagement data 120, and used to determine a suggested time location 137, which is then transmitted to the client application 132.

The client application 132 includes a timestamp generator 135 configured to generate a timestamp 140 based on the time location received via the timestamp selector 136. The timestamp 140 indicates the selected time location in the video stream 108. The client application 132 may allow the user to add any comments or description about the video stream 108 to be shared, and generate a message 141 to share the video stream 108 at the time location indicated by the timestamp 140, and transmit the message 141 to the messaging platform 104. In some examples, the message 141 includes the timestamp 140, a broadcast identifier 142 that identifies the video stream 108, a sender identifier 144 that identifies the user account of the message sharer.

In some examples, the client application 132 includes a thumbnail generator 114 configured to generate a timecoded thumbnail 146 from the video stream 108 using the timestamp 140. For example, the timecoded thumbnail 146 may include an image thumbnail from the frame of the video stream 108 associated with the timestamp 140. In some examples, the message 141 also includes the timecoded thumbnail 146 or a universal resource locator (URL) of the timecoded thumbnail 146. In some examples, the messaging platform 104 includes the thumbnail generator 114, and generates the timecoded thumbnail 146 at the server computer 102 in response to receiving the timestamp 140 from the client application 132.

The messaging platform 104 may store the timestamp 140, the broadcast identifier 142, the sender identifier 144, and/or the timecoded thumbnail 146 in a message database 118. Then, the messaging platform 104 may identify the users intended to receive the message 141 based on the connection graph 116 and the sender identifier 144, and then transmit the message to the identified users. For example, the messaging platform 104 may include a fan-out module 112 to receive the sender identifier 144 (e.g., a particular account via which a user is sending a message) from the message database 118, retrieve user graph data from connection graph 116, and/or determine which accounts 105 should receive the message 141. User graph data, for example, can identify which accounts 105 in the messaging platform 104 are "following" the particular account 105, and are therefore subscribed to receive messages from the particular account 105. User graph data may include any type of unidirectional (e.g., follower, subscription, etc.) and/or bidirectional (e.g., friendship, etc.) relationships among the accounts 105.

The message 141 with the timestamp 140 may be rendered in a timeline 152 of each account 105 linked to the sender identifier 144 in the connection graph 116. For example, the messaging platform 104 may transmit the message 141 with the timestamp 140, over the network 150, to the client application 132 executing on the computing device 160. The timeline 152 may be a ranked list of messages shown in chronological or reverse-chronological order. Within the ranked list, the message 141 may be provided on the timeline 152 as shown with respect to the computing device 160. Then, the user viewing their timeline 152 may notice the shared message 141 and select the video stream 108 with the timestamp 140 such that playback of the video stream 108 of the live broadcast is initiated from the time location indicated by the timestamp 140.

In some examples, the shared message 141 that identifies the video stream 108 includes a live tag 111 indicating that the video stream 108 is still occurring (e.g., a red box with the term "Live"), and a timestamp tag 113 indicating that replay starts from a time location before the current point (e.g., the time location indicated by the timestamp 140). In some examples, the shared message 141 includes the timecoded thumbnail 146. Upon selection of the video stream 108, the video stream 108 may be played back starting from the time location indicated by the timestamp 140. For example, replay video stack 103 may transmit the video stream 108, over the network 150, to the client application 132 executing on the computing device 160. However, in response to the selection of the live tag 111, the client application 132 may skip to the live point in the video stream 108. In this situation, the messaging platform 104 may switch to the real-time video stack 101 to provide the video stream 108 at its live time point.

The ability to share a live video or replay video starting at a designated moment, or point in time, may allow the user to highlight, or focus on, a specific portion of the video content, to tailor the video content to appeal to particular groups of viewers, and facilitate sharing and interactive discussion of the video content. From the perspective of the provider, or broadcaster, of the video content, facilitating access to meaningful moments in shared video content in this manner may draw more viewers to the live broadcast, may drive organic re-sharing of (what the viewers determine to be) the best portion(s) of the live broadcast, and may simplify the creation of video highlights. From the perspective of the viewer of the live broadcast/user sharing the video content, facilitating access to meaningful moments in shared video content in this manner may allow the user to quickly and easily share a specific moment, rather than the entirety of a video content stream, without missing the ongoing broadcast, and may allow friends/other viewers to watch live with the user and interact with the user after viewing the shared video content/shared moment.

FIG. 4A illustrates a UI screen showing a video stream 408 being rendered on a client application. In some examples, the video stream 408 is provided by the real-time video stack 101. Then, the user may select a share icon 438 in order to share the video stream 408 with other users of the messaging platform 104. FIG. 4B illustrates a UI screen depicting a movable UI element 436 (e.g., slider) that is movable on a time window 460 of the video stream 408, along with share option icons 439. Also, the UI screen of FIG. 4B shows a video display 462 that display the portion of the video stream 408 that corresponds to the position of the movable UI element 436. After the user selects the time location using the movable UI element 436, the user may select a UI element 464 to select the time location. FIG. 4C illustrates a UI screen that allows the user to comment on the video stream 408 before transmitting a message 441 to the messaging platform 104. As shown in FIG. 4C, the message 441 includes the timecoded thumbnail 446 with the live tag 411 and the timestamp tag 413. In response to a selection of a UI element 468, the message 441 is transmitted to the messaging platform 104 to be shared. FIG. 4D illustrates the message 441 shared on a timeline 452 of a user. The message 441 includes the timecoded thumbnail 446, the live tag 411 and the timestamp tag 413.

Figure 5B:
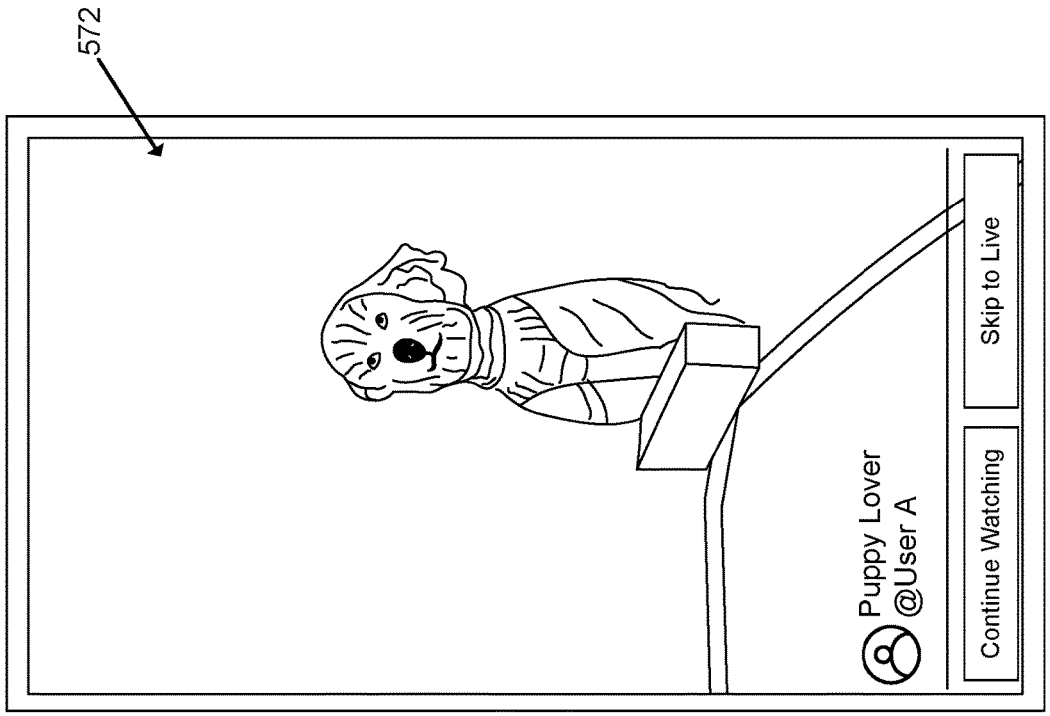
FIGS. 5A through 5D illustrates various user interface options for transitioning to a live time point in the video stream after reviewing a portion of the video stream from the timestamp according to an aspect.
Figure 5A:
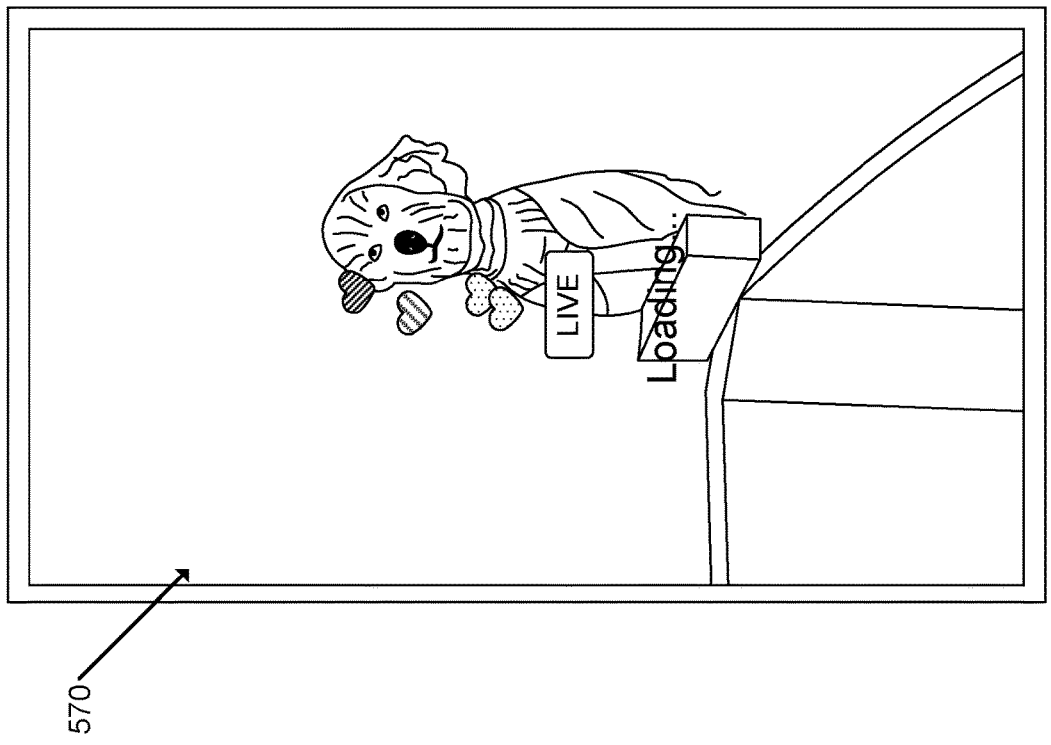
Figure 5D:
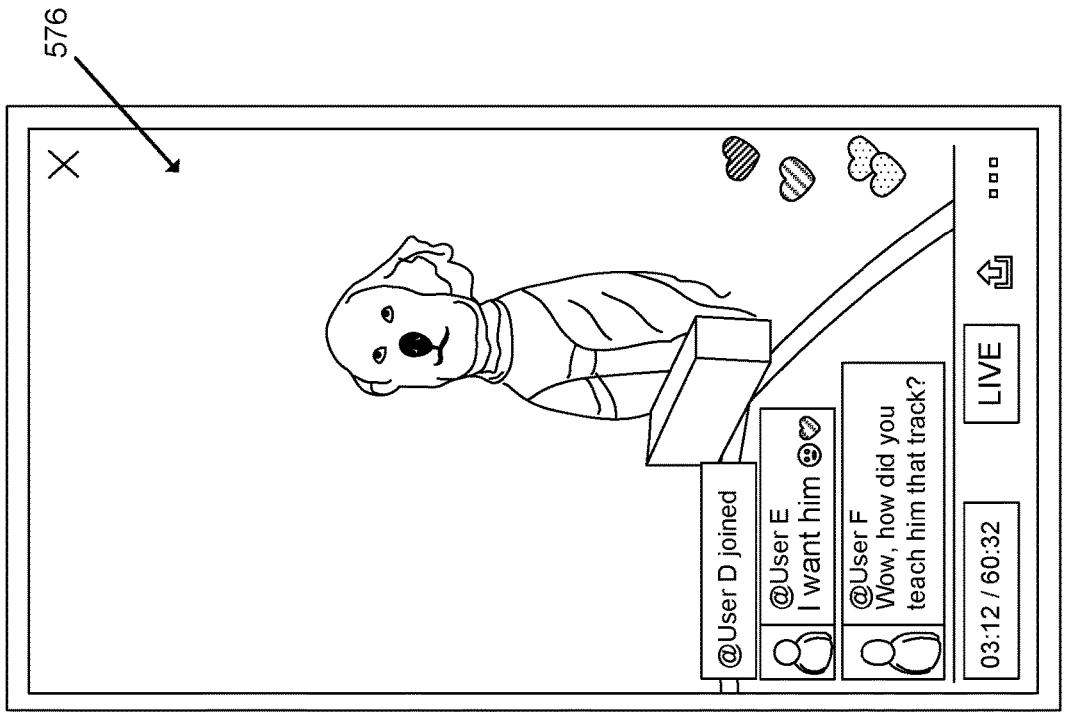
Figure 5C:
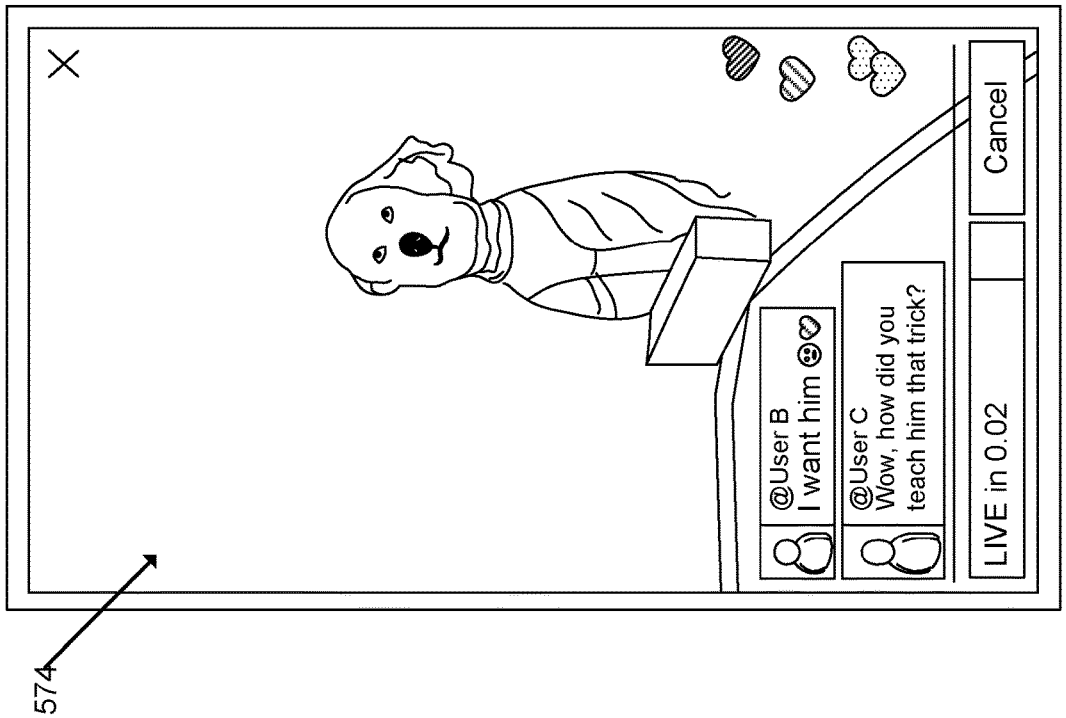

FIGS. 5A through 5C illustrates various user interface options for transitioning to a live time point in the video stream after reviewing a portion of the video stream from the timestamp according to an aspect. FIG. 5A illustrates a UI screen depicting a skip to live when the clip ends. FIG. 5B illustrates a UI screen depicting an ask to skip when the clip ends. FIG. 5C illustrates a skip to live after a count down. FIG. 5D illustrates a UI screen that lets the user continue watching the video stream (unless the live icon is pressed). In the examples of FIGS. 5A through 5C, the video content is served from the real-time video stack 101 when playing back from the timestamp, but when the video transitions to the live time point, the video content is served from the replay video stack 103.

Figure 6A:
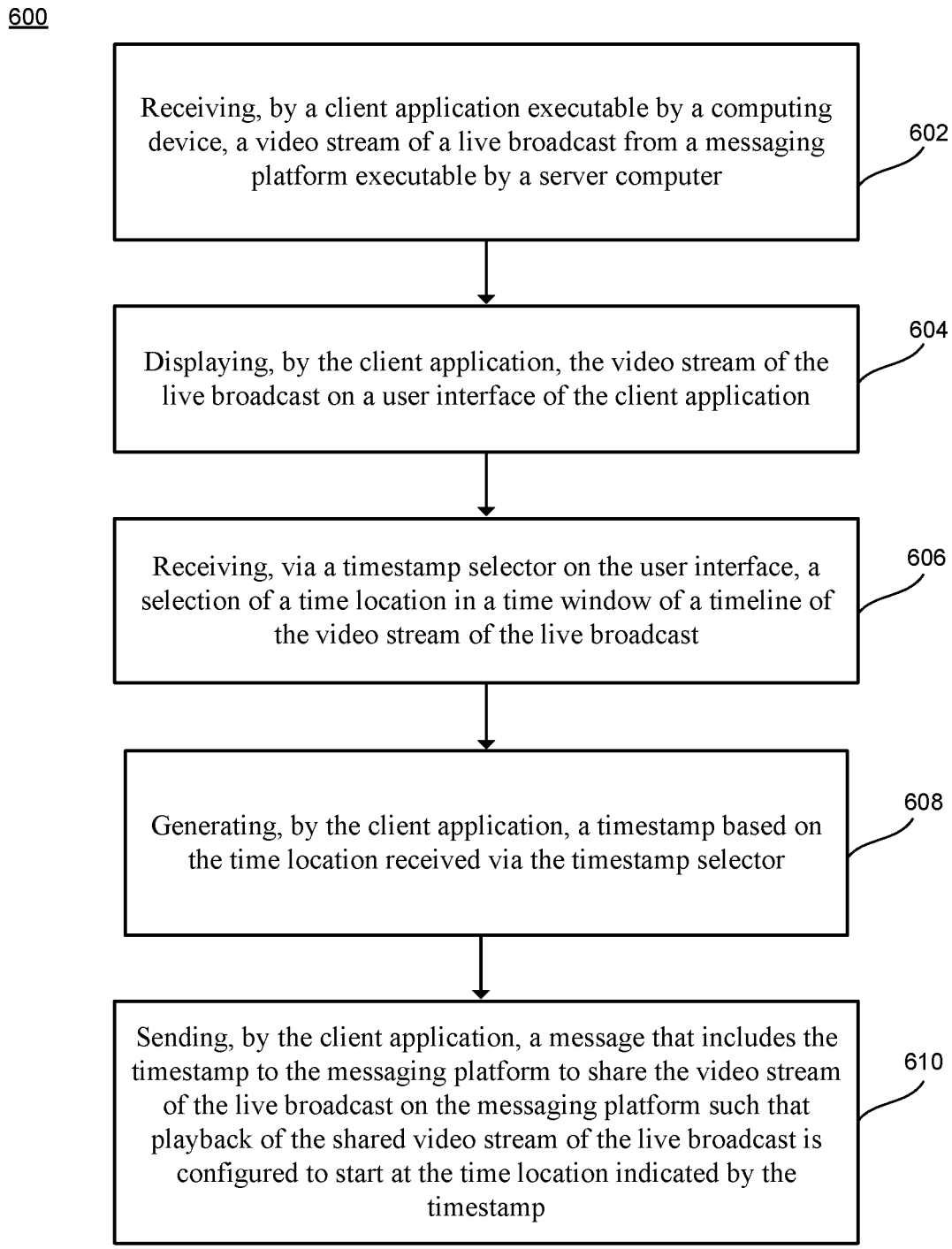
FIG. 6A illustrates a flow chart depicting example operations of the client application for sharing timecoded video streams of a live broadcast according to an aspect.

FIG. 6A illustrates a flow chart 600 depicting example operations of the client application for sharing timecoded video streams of a live broadcast according to an aspect.

Operation 602 includes receiving, by a client application 132 executable by a computing device 130, a video stream 108 of a live broadcast from a messaging platform 104 executable by a server computer 102. Operation 604 includes displaying, by the client application 132, the video stream 108 of the live broadcast on a user interface 134 of the client application 134. Operation 606 includes receiving, via a timestamp selector 136 on the user interface 134, a selection of a time location in a time window of a timeline of the video stream 108 of the live broadcast. Operation 608 includes generating, by the client application 132, a timestamp 140 based on the time location received via the timestamp selector 136. Operation 610 includes sending, by the client application 132, a message 141 that includes the timestamp 140 to the messaging platform 104 to share the video stream 108 of the live broadcast on the messaging platform 104 such that playback of the shared video stream 108 of the live broadcast is configured to start at the time location indicated by the timestamp 140.

Figure 6B:
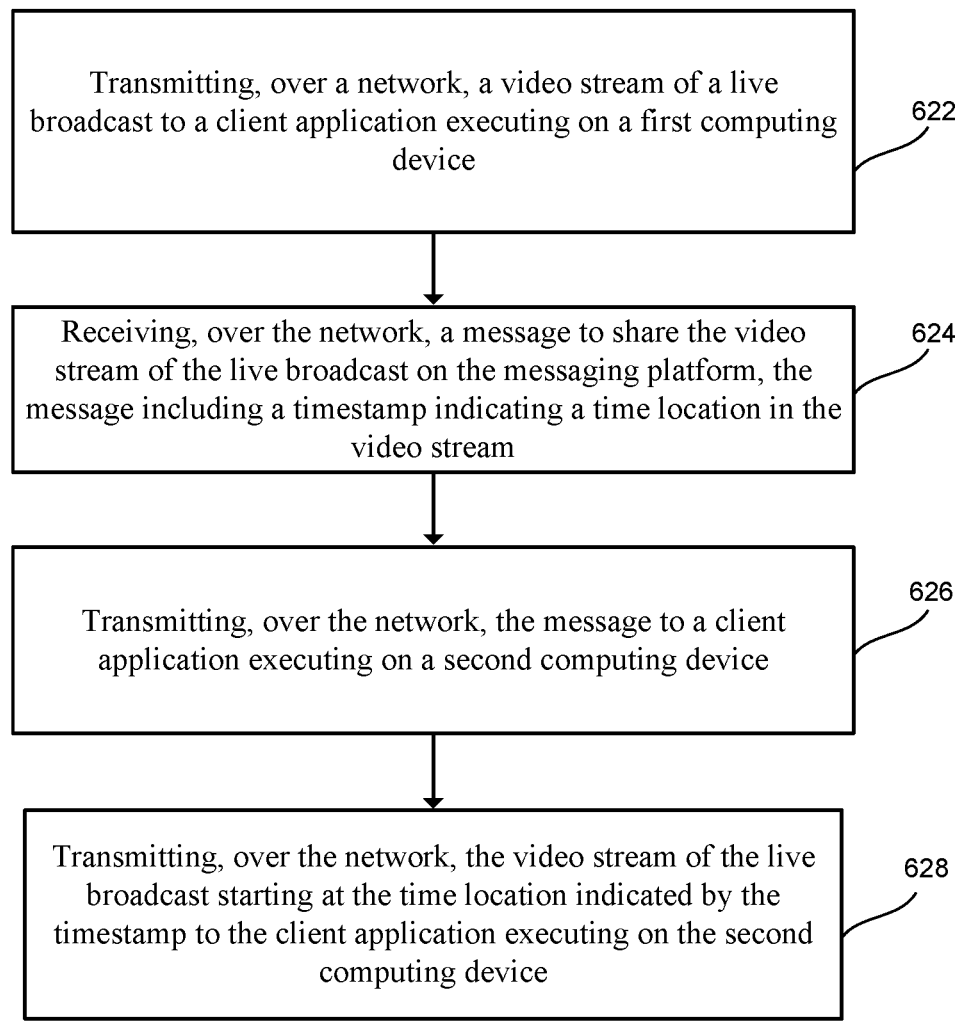
FIG. 6B illustrates a flow chart depicting example operations of the messaging platform for sharing timecoded video streams of a live broadcast according to an aspect.

FIG. 6B illustrates a flow chart 620 depicting example operations of the messaging platform for sharing timecoded video streams of a live broadcast according to an aspect.

Operation 622 includes transmitting, over a network 150, a video stream 108 of a live broadcast to a client application 132 executing on a first computing device (e.g., the computing device 130). Operation 624 includes receiving, over the network 150, a message 141 to share the video stream 108 of the live broadcast on the messaging platform 104, where the message 141 includes a timestamp 140 indicating a time location in the video stream 108. Operation 626 includes transmitting, over the network 105, the message 141 to a client application 132 executing on a second computing device (e.g., the computing device 160). Operation 628 includes transmitting, over the network 150, the video stream 108 of the live broadcast starting at the time location indicated by the timestamp 140 to the client application 132 executing on the second computing device (e.g., the computing device 160).

FIG. 6C illustrates a flow chart 630 depicting example operations of the client application for viewing timecoded video streams of a live broadcast according to an aspect.

Operation 632 includes displaying, by a client application 132 executable by a computing device 160, a message 141 in a timeline 152 of a user of the client application 132, where the message 141 identifies a video stream 108 of a live broadcast, and the message 141 includes a timestamp 140 indicating a time location in the video stream 108.

Operation 634 includes receiving, by the client application 132, a selection of the video stream 108. Operation 636 includes displaying, by the client application 132, the video stream 108 received from a replay video stack 103 of a messaging platform 104 such that playback of the video stream 108 starts at the time location indicated by the timestamp 140. Operation 638 includes receiving, by the client application 132, a live selection of the video stream 108. Operation 640 includes displaying, by the client application 132, the video stream 108 received from a real-time video stack 101 of the messaging platform 104 in response to the live selection.

Figure 7:
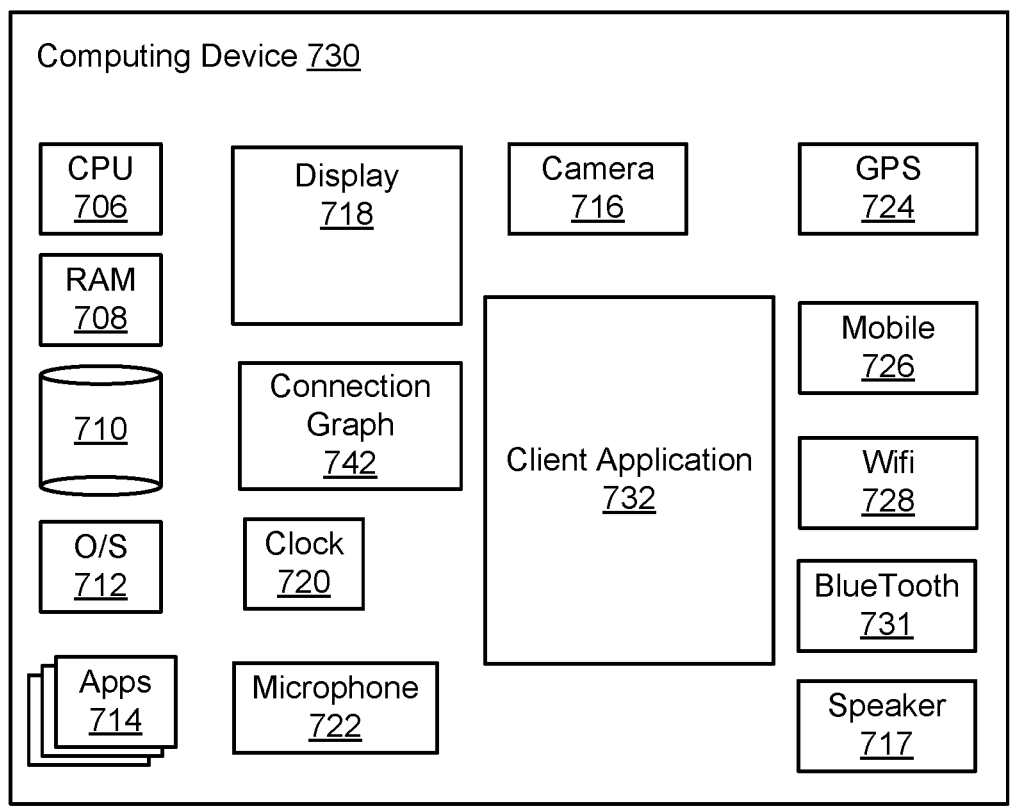
FIG. 7 illustrates an example of a computing device configured to execute a client application according to an aspect.

FIG. 7 is a schematic diagram of a computing device 730 according to aspect. The computing device 730 may be an example of the computing device 130 of FIG. 1.

As shown in FIG. 1, the computing device 730 may include one or more processors 706 (e.g., a processor formed in a substrate, such as a central processing unit, a graphics processor, etc.), a volatile memory 708, and nonvolatile memory 710. The volatile memory 708 may store, for example, instructions that are executed by the processor(s) 706, and the nonvolatile memory 710 may store, for example, various user data, instructions for executing an operating system, applications, etc.

The computing device 730 may include a plurality of applications 714, which can be executed by the computing device 730 (e.g., by the processor 706 executing one or more instructions stored in memory 708 or 710 that correspond to the application) and which may communicate with the operating system 712 (e.g., through one or more application programming interfaces (APIs)). Execution of the applications 714 can provide various functionalities to a user of the computing device 702. In a few examples, an email application may, with a user's permission, provide access to the user's email account and email messages associated with the account. A browser application may provide a Web browser to a user, so that the user may access content that can be loaded into, and displayed by, the browser application. A social network application can provide content to the user from contacts and sources that the user has chosen to be associated with within the social media platform associated with the social network application. A camera application can provide access to use of a camera 716 within the computing device 730 for capturing still pictures or video. In some implementations, the camera 716 may be external to the computing device 730, such as a camera that communicates wirelessly, e.g., via BLUETOOTH or Wi-Fi, with the computing device 730. Applications that provide a rich variety of other functionalities and information to the user also can be provided. In some implementations, the client application 732 may be considered one of the applications 714. Referring to FIGS. 1 and 7, in some examples, the client application 132 is the client application 132.

The computing device 730 includes a display 718 (e.g., a touchscreen display, an LED display, etc.) that can display a user interface for an application 714 that is being executed by the device. More than one application can be executed at a time. However, in some implementations (e.g., in the case of a smart phone), the size of the display is better suited for a single executing application to be displayed at a time. The executing application that is displayed on the display 718 can be referred to as a "front-facing" application. In some implementations, the display 718 may be housed in a structure separate from a structure housing one or more of the other components of the computing device 730 (e.g., the display 718 is a stand-alone display).

The computing device 730 may include internal speakers 717 that can provide an audio output from the device. The computing device 730 may also include a port or interface (e.g., USB, micro-USB, cable interfaces, HDMI, wireless interface, etc.) that can be used to connect the computing device 730 to external devices, e.g., speakers that may provide an audio output when connected to the device 730 or other types of sensors, cameras, or computing devices. The computing device 730 may also include a microphone 722 that detects sound in the environment of the computing device 730. In some implementations, the microphone 722 may be external to the computing device 730. The microphone 722, whether internal or external, may provide audio for a live video stream.

The computing device 730 may also include a clock 720 that determines a time and date and may include a GPS transceiver 724 that communicates with a global positioning system to determine a location of the computing device 730. The location may be provided as part of the metadata associated with a real-time video stream. The computing device 730 also includes various network interface circuitry, such as for example, a mobile network interface 726 through which the computing device 730 can communicate with a cellular network, a Wi-Fi network interface 728 with which the computing device 730 can communicate with a Wi-Fi base station, a BLUETOOTH network interface 731 with which the computing device 730 can communicate with other BLUETOOTH devices (e.g., an external camera, microphone, or speakers), and/or an Ethernet connection or other wired connection that enables the computing device 730 to access the network 150 of FIG. 1. The computing device 730 may include other sensors (not shown), such as, for example, an ambient light sensor, a temperature sensor, physical orientation sensors, and/or an accelerometer, etc. In some examples, a connection graph 742 may be a subset of the connection graph 116 that resides on the server computer 102.

In some examples, the client application 732 may also be configured to attach a timestamp packet to the frames of the real-time video stream provided from the computing device 730 to the server computer 102. This special packet enables the server computer 102 to associate an engagement with a particular time in the live feed broadcast. The client application 732 may also be configured to use one of the computing components (e.g., Wi-Fi network interface 728, mobile network interface 726, etc.) to provide the real-time video stream, over the network 150, to the server computer 102. The client application 732 may also be configured to receive engagement indications as well as metadata about the real-time video stream from the server computer 102. The engagement indications may be in a data stream that is associated with the video stream. The metadata may include information such as how many viewers have joined the real-time video stream and are currently viewing the video stream. The engagement indications may represent feedback and information from the viewers of the video stream. For example, the engagements may include comments, signals of appreciation, share notifications, viewer join notifications, etc. The client application 732 may be configured to receive the data stream and to generate representations of the engagement indications in the data stream and provide the representations to the display 718.

The client application 732 may be configured to trigger the display of the icons (e.g., hearts) for a predetermined period of time. For example, each icon may appear on the display 718 of the computing device 730 for three or five seconds and then disappear or fade out. The engagement may be associated with a specific time, e.g., a timestamp from a timestamp packet in the video stream, and an engagement may be displayed during a period that starts at the timestamp until the predetermined period of time expires.

Figure 8:
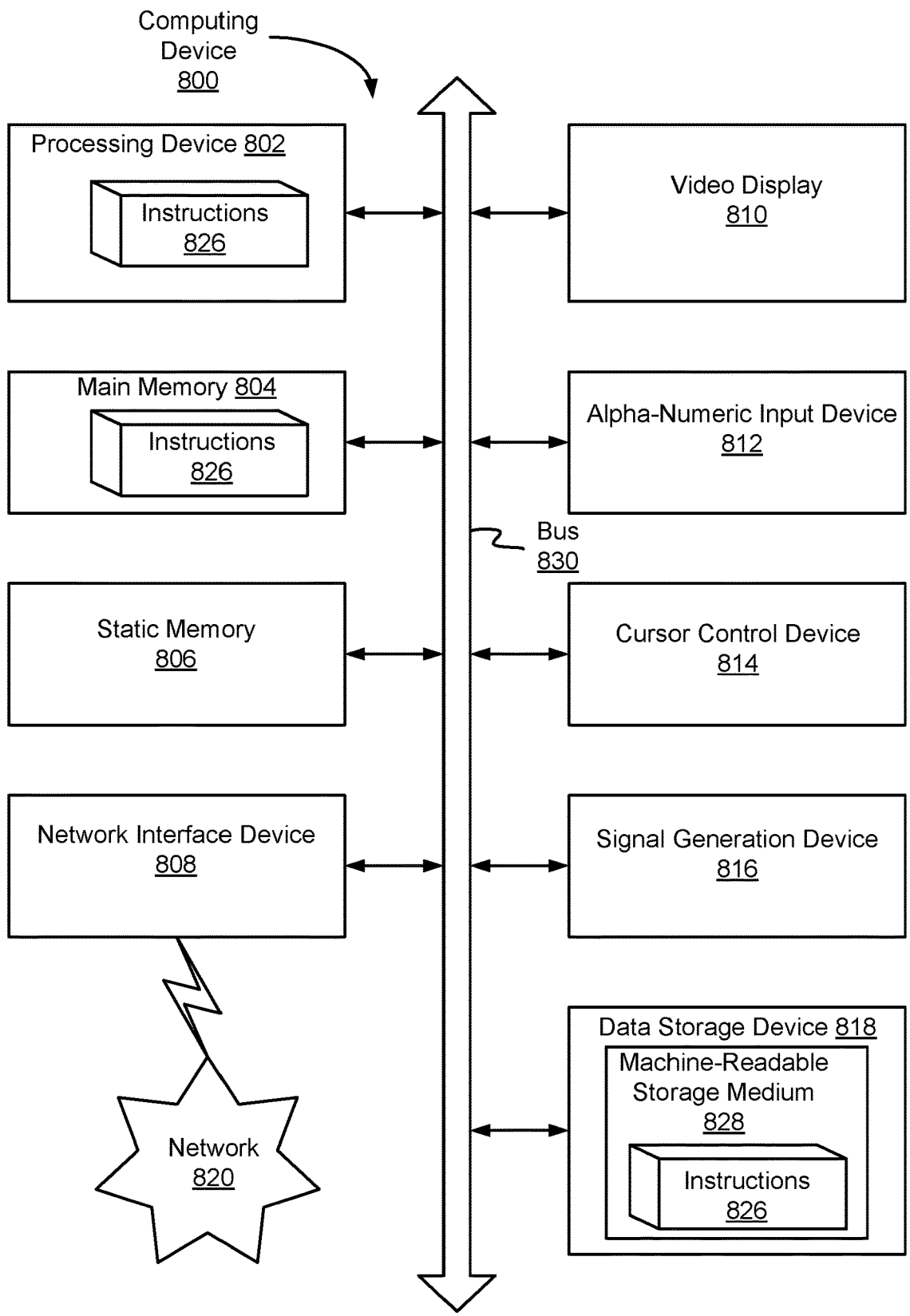
FIG. 8 illustrates an example of a server computing device according to an aspect.

FIG. 8 is a diagrammatic representation of a machine in the example form of a computing device 800 within which a set of instructions, for causing the machine to perform any one or more of the functions of the messaging platform 104 executing on the server computer 102 of FIG. 1. The computing device 800 may be a rackmount server, a server computer, or a mainframe computer, within which a set of instructions, for causing the machine to perform any one or more of the functions with respect to the messaging platform 104 discussed herein. In some examples, the computing device 800 may operate in the capacity of a server machine in client-server network environment. Further, while only a single machine is illustrated, the term "machine" shall also be taken to include any collection of machines that individually or jointly execute a set (or multiple sets) of instructions to perform any one or more of the functions of the messaging platform 104 discussed herein.

In some examples, the computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 818, which communicate with each other via a bus 830.

In some examples, processing device 802 represents one or more processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the functions and steps discussed herein.

In some examples, the computing device 800 may further include a network interface device 808 which may communicate with a network 820. In some examples, the network 820 may be the network 150 of FIG. 1. In some examples, the computing device 800 may be associated with a video display unit 810 (e.g., a liquid crystal display (LCD) or a cathode ray tube (CRT)), an alphanumeric input device 812 (e.g., a keyboard), a cursor control device 814 (e.g., a mouse) and a signal generation device 816 (e.g., a speaker). In some examples, the video display unit 810, the alphanumeric input device 812, and the cursor control device 814 may be combined into a single component or device (e.g., an LCD touch screen).

The data storage device 818 may include a computer-readable storage medium 828 on which is stored one or more sets of instructions 826 embodying any one or more of the methodologies or functions described herein. The instructions 826 may also reside, completely or at least partially, within the main memory 804 and/or within the processing device 802 during execution thereof by the computing device 800, the main memory 804 and the processing device 802 also constituting computer-readable media. In some examples, the instructions may further be transmitted or received over the network 820 via the network interface device 808.

While the computer-readable storage medium 828 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or subcombinations of the functions, components and/or features of the different implementations described.

What is claimed is:

1. A method comprising:
receiving, by a client application executable by a computing device, a live video stream from a messaging platform executable by at least one server computer;
displaying the live video stream on a user interface of the client application;
receiving receipt of a share selection from a user of the client application;
displaying a video segment selection screen on the user interface in response to the receipt of the share selection, the video segment selection screen including a movable user interface (UI) element, the video segment selection screen including a section that displays a replay portion of the live video stream within a time window that corresponds to a position of the movable UI element, the time window having a temporal length that is a subset of a length of the live video stream;
receiving a selection of a time location in the time window based on a position of the movable UI element;
generating a timestamp based on the time location in the time window; and
sending, via the messaging platform, a message about the live video stream to at least one user connected to the user in a connection graph, the message, when displayed on a recipient device, including a first user interface (UI) element for a first viewing option and a second UI element for a second viewing option,
the first UI element, when selected, causing the live video stream to be streamed from the messaging platform from the time location indicated by the timestamp, the second UI element, when selected, causing the live video stream to be streamed from the messaging platform from a live point,
wherein, in the video segment selection screen, the section with the replay portion of the live video stream is displayed in a foreground, and at least a portion of the live video stream at the live point is displayed in a background.

2. The method of claim 1, wherein the live video stream is streamed from a live video stack of the messaging platform when the second UI element is selected, wherein the live video stream is streamed from a reply video stack of the messaging platform when the first UI element is selected, the reply video stack being separate from the live video stack.

3. The method of claim 1, wherein the message, when displayed on the recipient device, includes an image from the live video stream, the first and second UI elements being displayed on the image.

4. The method of claim 1, further comprising:
receiving a suggested time location in the live video stream; and
displaying the suggested time location as a recommendation in the video segment selection screen to select the time location.

5. A system comprising:
a messaging platform executable by at least one server computer, the messaging platform configured to:
transmit, over a network, a live video stream to a client application executing on a first computing device;
receive, over the network, a message to share the live video stream on the messaging platform, the message including a timestamp indicating a time location in the live video stream;
transmit, over the network, the message about the live video stream video to at least one user connected to a user of the client application in a connection graph, the message, when displayed on a recipient device, including a first user interface (UI) element for a first viewing option and a second UI element for a second viewing option;
stream, by a replay video stack of the messaging platform and in response to receipt of selection of the first UI element, the live video stream to the recipient device from the time location indicated by the timestamp;
stream, by a live video stack of the messaging platform and in response to receipt of selection of the second UI element, the live video stream to the recipient device from a live point;
receive an engagement from the client application, the engagement identifying a time of a user gesture, the time of the user gesture being correlated with a frame of the live video stream; and
transmit an engagement indicator to the recipient device, the engagement indicator configured to render a display icon on a display of the recipient device within a threshold period of time from the time of the user gesture.

6. The system of claim 5, wherein the message, when displayed on the recipient device, includes an image from the live video stream, the image corresponding to a frame indicated by the timestamp, the first and second UI elements being overlaid on the image.

7. The system of claim 5, wherein the user gesture includes a tap on a display screen.

8. The system of claim 5, wherein the display icon is configured to move over time on the display of the recipient device.

9. The system of claim 5, wherein the messaging platform is configured to:
receive a plurality of engagements from a plurality of viewers during the live video stream, each engagement of the plurality of engagements being correlated with a particular time in the live video stream;
determine a suggested time location in the live video stream based on a volume of the plurality of engagements within a period of time; and
transmit the suggested time location as a recommendation to select a timestamp.

10. The system of claim 5, wherein the messaging platform is configured to:
receive social media statistics about the live video stream, the social media statistics including information identifying a volume of messages having one or more keywords associated with the live video stream, the volume of messages being correlated with a timeline of the live video stream;
determine a suggested time location in the live video stream based on the volume of messages within a period of time exceeding a threshold level; and
transmit the suggested time location as a recommendation to select a timestamp.

11. The method of claim 1, wherein the time window has a fixed temporal length.

12. The method of claim 1, wherein the time window is two minutes or less.

13. A method comprising:
receiving, by a client application executable by a computing device, a live video stream from a messaging platform executable by at least one server computer;

displaying the live video stream on a user interface of the client application;

receiving receipt of a share selection from a user of the client application;

displaying a video segment selection screen on the user interface in response to the receipt of the share selection, the video segment selection screen including a movable user interface (UI) element, the video segment selection screen including a section that displays a replay portion of the live video stream within a time window that corresponds to a position of the movable UI element, the time window having a temporal length that is a subset of a length of the live video stream;

receiving a selection of a time location in the time window based on a position of the movable UI element;

generating a timestamp based on the time location in the time window; and sending, via the messaging platform, a message about the live video stream to at least one user connected to the user in a connection graph, the message, when displayed on a recipient device, including a first user interface (UI) element for a first viewing option and a second UI element for a second viewing option, the first UI element, when selected, causing the live video stream to be streamed from the messaging platform from the time location indicated by the timestamp, the second UI element, when selected, causing the live video stream to be streamed from the messaging platform from a live point, wherein the live video stream is streamed from the live point from a live video stack of the messaging platform, the live video stack providing live video streams from their latest points to users of the messaging platform, wherein the replay portion of the live video stream is streamed from a replay video stack of the messaging platform, wherein a source of the live video stream is switched between the replay video stack and the live video stack based on a selected time point in the live video stream.

14. The method of claim 13, wherein the video segment selection screen displays a UI element for selection of a new message, a UI element for selection of a direct message, and a UI element to share the live video stream.

15. A method of comprising:

receiving, by a client application executable by a computing device, a live video stream from a messaging platform executable by at least one server computer;

displaying the live video stream on a user interface of the client application;

correlating a time of a user gesture with a frame of the live video stream, the correlated time being used by the messaging platform to associate an engagement with a particular time in the live video stream;

receiving receipt of a share selection from a user of the client application;

displaying a video segment selection screen on the user interface in response to the receipt of the share selection, the video segment selection screen including a movable user interface (UI) element, the video segment selection screen including a section that displays a replay portion of the live video stream within a time window that corresponds to a position of the movable UI element, the time window having a temporal length that is a subset of a length of the live video stream;

receiving a selection of a time location in the time window based on a position of the movable UI element;

generating a timestamp based on the time location in the time window; and sending, via the messaging platform, a message about the live video stream to at least one user connected to the user in a connection graph, the message, when displayed on a recipient device, including a first user interface (UI) element for a first viewing option and a second UI element for a second viewing option, the first UI element, when selected, causing the live video stream to be streamed from the messaging platform from the time location indicated by the timestamp, the second UI element, when selected, causing the live video stream to be streamed from the messaging platform from a live point.

* * * * *